Dec. 22, 1925.  1,566,658
H. R. DURYEA
CAMERA
Filed Aug. 28, 1922   3 Sheets-Sheet 1

Inventor
Harry R. Duryea

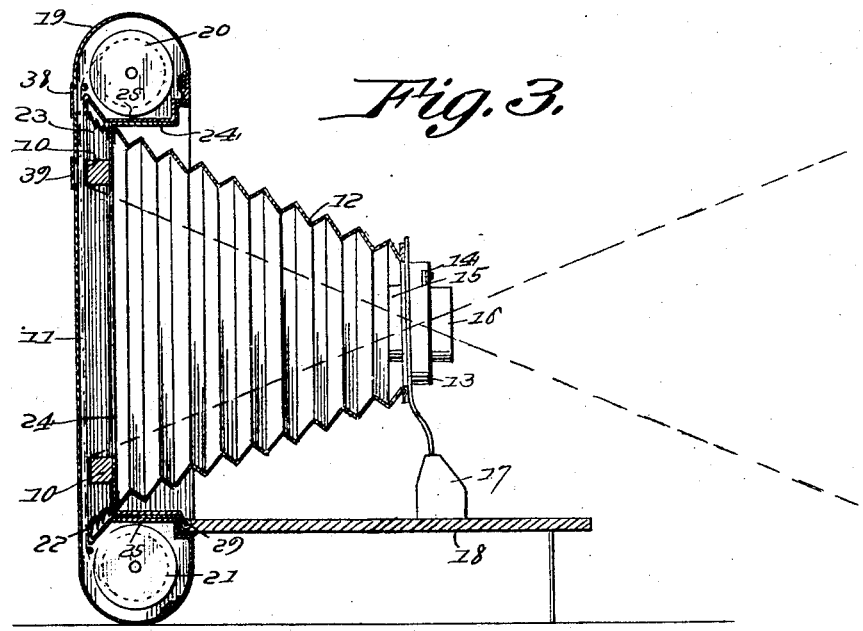
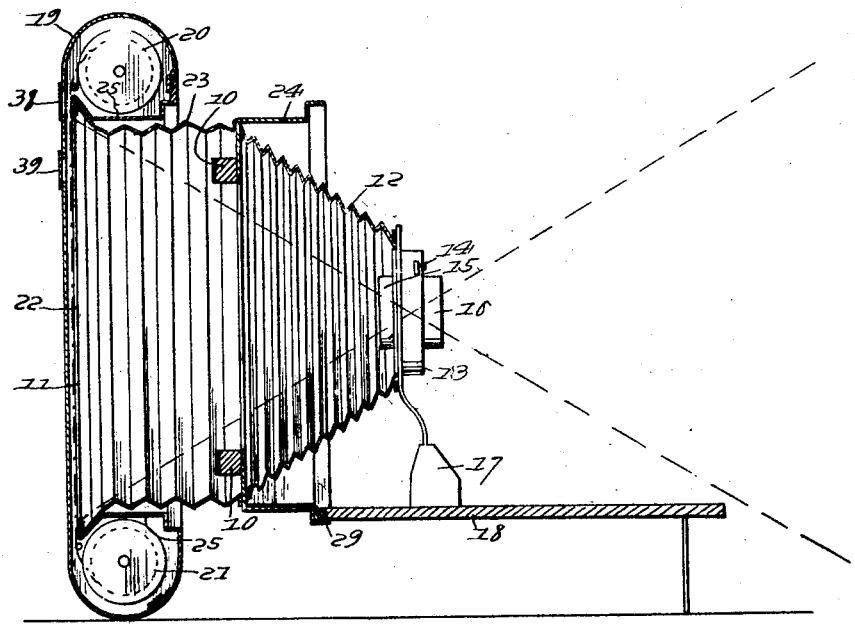

Dec. 22, 1925.  1,566,658
H. R. DURYEA
CAMERA
Filed Aug. 28, 1922   3 Sheets-Sheet 3

Inventor
Harry R. Duryea

Patented Dec. 22, 1925.

1,566,658

UNITED STATES PATENT OFFICE.

HARRY R. DURYEA, OF PITTSFORD, NEW YORK, ASSIGNOR OF ONE-HALF TO ALLYN T. GILBERT, OF NEWARK, NEW JERSEY.

CAMERA.

Application filed August 28, 1922. Serial No. 584,825.

*To all whom it may concern:*

Be it known that I, HARRY R. DURYEA, a citizen of the United States, residing at Pittsford, in the county of Monroe and State of New York, have invented a new and useful Camera, of which the following is a specification.

The object is to provide a means whereby the capacity of a portable or tourist's camera in the matter of the field of exposure of the sensitized medium may be enlarged as compared with that of the commercial types of cameras without increasing the dimensions of the camera case and without using an attachable or other extension to the case, and in this connection it is a further object to provide means whereby such a device may be used interchangeably and alternately with relation to the conventional means to present exposures of different areas within the capacity of the structure to suit different scenes or subjects to be photographed.

It is a common experience of amateur photographers and tourists, particularly of the artistic type, that in selecting a scene, as a landscape, for reproduction, the composition appears to demand greater length in proportion to the width, for example, than it is possible to obtain without reducing the scale of the photograph, as by increasing the distance from the subject to a greater extent than the detail of the scene will properly permit while maintaining a sufficient sharpness to result in a satisfactory product; and again it frequently happens that to take a group picture or a full length picture of an individual it is desirable in order to secure a sufficient size of the figures to reduce the distance from the subject to an extent impossible with the commercial cameras if the subject is to occupy the greater portion of the available field of the photo. Such pictures require length of the exposed area, either horizontally for a group or landscape or vertically for an individual, tower or tall building or other structure, and while the desired reproduction can be obtained by using a larger camera, the object requires an increase in length only of the sensitized medium and the unused side portions of the exposure are ordinarily trimmed off, with a consequent waste of film, It is therefore an object of the invention to provide for making extra length exposures, as of a group and laterally extensive or panoramic landscapes or of an individual full length, a tower or tall structure under such conditions as to sufficiently and artistically, and at the same time economically occupy the field of the exposure without any waste of film, and yet afford a reproduction on the sufficiently large and pleasing scale to develop the detail of the subject.

With these objects in view the invention consists in a construction of which a typical embodiment, subject however to substantial changes in form, proportions and details, is illustrated in the accompanying drawings wherein:

Fig. 3 is a sectional view of the same with the parts adjusted to provide a film exposure of the conventional or usual area.

Fig. 4 is a sectional view.

Figure 1:
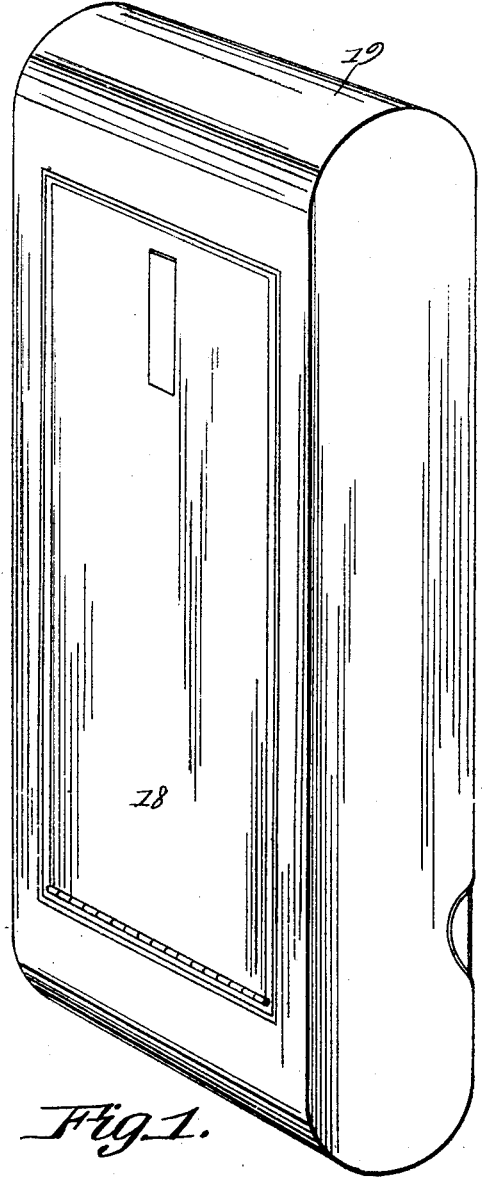
Fig. 1 is a perspective view.
Figure 2:
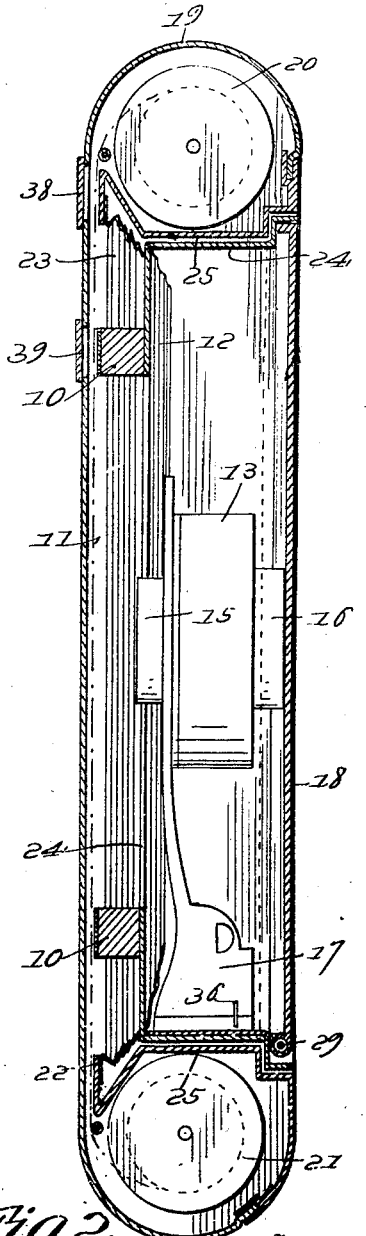
Fig. 2 is a sectional view of the camera in its folded or portable condition.
Figure 6:
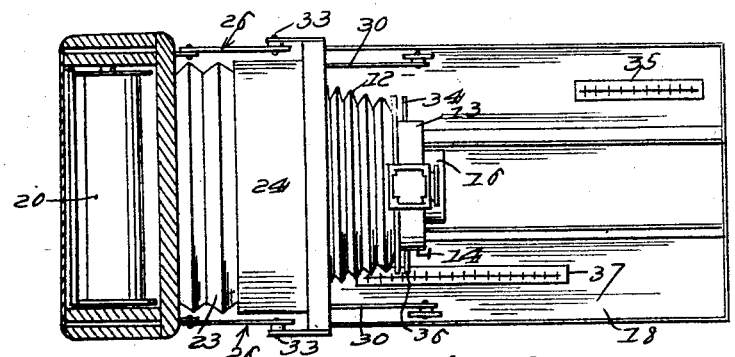
Fig. 6 is a plan view partly in section, of the camera with the parts adjusted to provide an extended film exposure, as in taking special or panoramic or group pictures, or full length portraits.

In carrying out the invention of which the fundamental idea is to provide for taking pictures of different sizes, or having one dimension, such as the length, which may be varied at the option of the photographer, it has been the aim to extend the capacity of the apparatus without objectionably complicating the construction and without involving the use of any detachable or removable or supplemental elements, and without in any way increasing the size or modifying the shape or appearance of the conventional type of amateur or tourist's camera which is primarily designed with a view to compactness, convenience, simplicity and efficiency in construction and operation.

Therefore, the improved structure embodies essentially an exposure defining or bounding frame 10, adapted for contact with the sensitized film 11, as in the ordinary practice, and connected by the usual bellows 12, with the head or lens carriage 13, carrying the shutter 14 and lenses 15 and 16. The head or carriage is supported in the usual way the traveller 17 operating on the camera bed 18, which when folded forms one wall of the case 19.

The exposure defining or bounding element represented by the frame 10, however, instead of being stationary or occupying a fixed relation with the path of the film (carried as usual by spools 20 and 21), is movable from and toward and in a path perpendicular to the plane of the film, with the obvious effect of increasing the exposure or the area of exposure of the film as it recedes from the film and approaches the lens.

For convenience in reference the frame 10 and bellows 12 which in general functions are analogous to the similar parts commonly employed in cameras will be referred to hereinafter as the main exposure defining means and the main bellows, respectively and in cooperation therewith there is employed a supplemental exposure defining frame 22, with which the main exposure defining frame 10, is connected by means of a supplemental bellows 23, adapted to be extended as the main frame 10 is advanced from the plane of the film and to fold within the thickness of said main frame, as shown in Figure 3, when the latter is in its retracted or normal position.

As a means of fortifying the structure to secure a desirable rigidity when the supplemental bellows is extended to increase the length of the exposure area, it is proposed to employ a movable bellows or carrier frame 24, to support the exposure defining frame 10, and having the adjacent ends of the main and supplemental bellows attached thereto, and adapted when the latter is folded as in Figure 3, to fit in a seat frame 25, of similar contour in the casing. When extended the bellows frame is carried by toggle brackets 26, having jointed arm members geared together at 27, for simultaneous and equal movement and connected by a spring 28. The camera bed is supported by this bellows or carrier frame, to which it is hinged at 29, and connected by slotted side braces 30, pivoted to the bed at 31, and having the slot 32, slidably engaged with the pin 33, on the carrier frame.

The lens carriage in addition to having the usual lock, or detent 34, for engagement in the usual way with the teeth of distance scale 35, when adjusted as in Figure 3, to take pictures in the ordinary way, is provided with a lock or detent 36, to traverse and engage distance scale 37, when the apparatus is adjusted to take enlarged or extended pictures. It is obvious that the optical axis must be of the same length when the exposure defining frame is advanced for an extended exposure as when in position to define the minimum exposure area.

When a picture is to be taken on the usual or standard exposure area, for which the particular camera is designed, the side of the case forming the camera bed is opened out and the carriage is drawn forward and adjusted by reference to the distance scale 35, in all respects as in the ordinary practice, the bellows frame 24 remaining nested in its seat and the bed having the conventional position with relation to the case (see Fig. 3).

Figure 5:
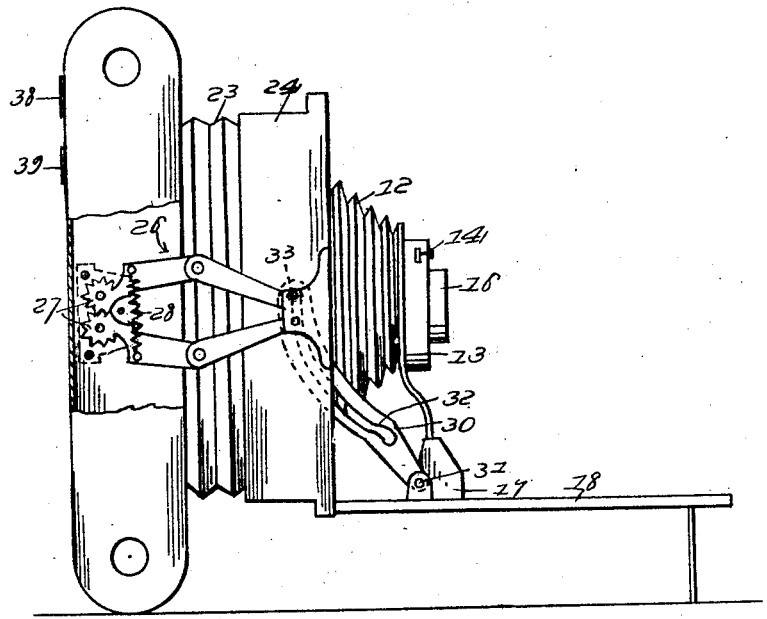
Fig. 5 is a side view, partly broken away.

If on the other hand, the subject to be reproduced is long, horizontally or vertically, in proportion to its width as compared with the dimensions of the normal exposure are of the camera, the bed and bellows frame are drawn forward (see Figs. 4 and 5) to extend the auxiliary bellows and advance the exposure defining frame 10, with relation to the plane of the film, so as to increase the extent of exposure of the film or sensitized surface to include practically the entire distance between the film spools,—unlimited by the defining frame 10, as when positioned close to the plane of the film (Fig. 3). The distance scale 37, is now used and adjustments are made in reference thereto.

The design of camera selected as a vehicle for the illustration of a typical form of the invention as one employing the popular doublet lens,—of which, as is well known, one element has twice the focal length of the doublet, but if the auxiliary bellows or extension medium 23, is made long enough to permit of drawing out to double the focal length of the lens, a single element of the lens may be used to double the size of the image as projected upon the sensitized medium. In other words, if the focal length of the doublet lens is five inches, for example, and makes an image one inch in height at a given distance, the extension indicated to a focal length of ten inches, with one element of the lens, will, at the same given distance, result in producing an image of two inches, or double the original height.

In the adaptation of the principle of enlargement of the exposure area of the camera, within the limits of a case of conventional or standard dimensions, it has been found expedient, illustratively, to utilize all of the available space between the spools 20 and 21, by arranging the spool housings, consisting in this instance of the auxiliary exposure defining and bellows anchoring frame 22, and seat frame 25, in close relation to the spools and conforming in general outline thereto, with the frame 22, forming a V-shaped channel, as shown, and when the main exposure defining frame 10, is in the nested or normal relation therewith (Fig. 3) the intervening space serves to house the collapsed auxiliary bellows, within the depth (from front to rear) of said frames.

Claims:

1. A photographic camera having inner and outer exposure defining frames, one of which is movable in a path perpendicular to the plane of the other, and an extensible and collapsible guard between the frames and a single holder for the sensitized material supported in fixed relation to the outer exposure defining frame and adapted to support the material in proper optical relation to the lens of the camera for any relative adjustment between the two exposure defining frames.

2. A photographic camera having inner and outer exposure defining frames, one of which is movable in a path perpendicular to the plane of the other, and bellows connecting the frames and a single holder for the sensitized material supported in fixed relation to the outer exposure defining frame and adapted to support the material in proper optical relation to the lens of the camera for any relative adjustment between the two exposure defining frames.

3. A photographic camera having inner and outer exposure defining frames, one of which is movable in a path perpendicular to the plane of the other, a lens frame movable relatively to the inner frame, bellows connecting the lens frame with the inner frame, and bellows connecting the inner frame with the outer frame and a single holder for the sensitized material supported in fixed relation to the outer exposure defining frame and adapted to support the material in proper optical relation to the lens of the camera for any relative adjustment between the two exposure defining frames.

4. A photographic camera having two rectangular exposure defining frames, one of which is fixed with reference to the plane of the sensitized material and the other of which is adjustable with reference to said plane, both frames having the same width but being of different lengths and a single holder for the sensitized material supported in fixed relation to the outer exposure defining frame and adapted to support the material in proper optical relation to the lens of the camera for any relative adjustment between the two exposure defining frames.

5. A photographic camera having a case provided with film holding and guiding means, a lens carriage, extension bellows between the carriage and the plane of the film, permitting the lens carriage to be moved relatively to the plane of the film, a rectangular exposure defining frame fixed with reference to the film guiding means, and an inner rectangular exposure defining frame having the same width as the first mentioned rectangular exposure defining frame but being shorter in length, said rectangular inner exposure defining frame being adjustable with reference to the first mentioned rectangular exposure defining frame and having the lens carriage adjustable relatively to it and a single holder for the sensitized material supported in fixed relation to the outer exposure defining frame and adapted to support the material in proper optical relation to the lens of the camera for any relative adjustment between the two exposure defining frames.

6. A photographic camera having a plurality of exposure defining frames, one of which is movable toward and from the plane of the sensitized surfaces and a single holder for the sensitized material supported in fixed relation to the outer exposure defining frame and adapted to support the material in proper optical relation to the lens of the camera for any relative adjustment between the two exposure defining frames.

7. A photographic camera having nested inner and outer exposure defining frames of which the former is movable in a path perpendicular to the plane of the latter and a single holder for the sensitized material supported in fixed relation to the outer exposure defining frame and adapted to support the material in proper optical relation to the lens of the camera for any relative adjustment between the two exposure defining frames.

8. A photographic camera having nested inner and outer exposure defining frames of which the former is movable in a path perpendicular to the plane of the latter and an extensible and collapsible guard between the frames and a single holder for the sensitized material supported in fixed relation to the outer exposure defining frame and adapted to support the material in proper optical relation to the lens of the camera for any relative adjustment between the two exposure defining frames.

9. A photographic camera having nested inner and outer exposure defining frames of which the former is movable in a path perpendicular to the plane of the latter and a bellows connection between the frames and a single holder for the sensitized material supported in fixed relation to the outer exposure defining frame and adapted to support the material in proper optical relation to the lens of the camera for any relative adjustment between the two exposure defining frames.

10. A photographic camera having nested inner and outer exposure defining frames of which the former is movable in a path perpendicular to the plane of the latter and a bellows connection between the frames foldable into a common plane therewith when the frames are nested and a single holder for the sensitized material supported in fixed relation to the outer exposure defining frame and adapted to support the material in proper optical relation to the lens of the camera for any relative adjustment between the two exposure defining frames.

11. A photographic camera having means for supporting a sensitized medium means for defining the exposure of the medium arranged in fixed relation to said supporting means, and a second means for defining the exposure of the medium, one of said means being movable in a path parallel with the optical axis to vary the area of exposure.

12. A photographic camera having means for supporting a sensitized medium means for defining the exposure of the medium arranged in fixed relation to said supporting means, and a second means for defining the exposure of the medium, one of said means being movable in a path parallel with the optical axis to vary the area of exposure and a lens movable relative to the first named means to adjust the length of said axis.

13. A photographic camera having a case provided with film holding and guiding means, an exposure defining means arranged in fixed relation to said film holding and guiding means, a lens carriage, extension bellows between the carriage and the plane of the film and an exposure defining frame carried by the bellows between the carriage and the plane of the film and movable toward and from the plane of the latter.

14. A photographic camera having a case provided with film holding and guiding means, an exposure defining means arranged in fixed relation to said film holding and guiding means, a lens carriage, extension bellows between the carriage and the plane of the film and an exposure defining frame carried by the bellows between the carriage and the plane of the film and movable toward and from the plane of the latter, said case having a foldable camera bed for extension to support the carriage.

15. A photographic camera having a case provided with film holding and guiding means, an exposure defining means arranged in fixed relation to said film holding and guiding means, a lens carriage, extension bellows between the carriage and the plane of the film and an exposure defining frame carried by the bellows between the carriage and the plane of the film and movable toward and from the plane of the latter, said case having a foldable camera bed for extension to support the carriage and a carrier frame movable relative to the case for supporting the bed.

16. A photographic camera having a case provided with a film guide and a foldable camera bed, an exposure defining frame movable toward and from the plane of the film guide, exposure defining means arranged in fixed relation to the film guide, a lens carriage, and main and auxiliary bellows elements extending from the plane of said defining frame respectively to the lens carriage and to the film guide.

17. A photographic camera having a case provided with a film guide and a foldable camera bed, an exposure defining frame movable toward and from the plane of the film guide, exposure defining means arranged in fixed relation to the film guide, a lens carriage, and main and auxiliary bellows elements extending from the plane of said defining frame respectively to the lens carriage and to the film guide and a carrier frame supporting the camera bed and movable therewith in a path perpendicular to the plane of the case and parallel with the path of the carriage.

18. A photographic camera having a case provided with a film guide and a foldable camera bed, an exposure defining frame movable toward and from the plane of the film guide, exposure defining means arranged in fixed relation to the film guide, a lens carriage, and main and auxiliary bellows elements extending from the plane of said defining frame respectively to the lens carriage and to the film guide and a carrier frame supporting the camera bed and movable therewith in a path perpendicular to the plane of the case and parallel with the path of the carriage, the case having an enclosed seat for the reception of the carrier frame when folded.

19. A photographic camera having a case provided with a film guide and a foldable camera bed, an exposure defining frame movable toward and from the plane of the film guide, exposure defining means arranged in fixed relation to the film guide, a lens carriage, and main and auxiliary bellows elements extending from the plane of said defining frame respectively to the lens carriage and to the film guide and a carrier frame supporting the camera bed and movable therewith in a path perpendicular to the plane of the case and parallel with the path of the carriage, the case having an enclosed seating frame with which the carrier frame interlocks when folded.

20. A photographic camera having a case provided with a film guide and a foldable camera bed, a lens carriage for support by the bed, an exposure defining frame movable toward and from the plane of the film guide, exposure defining means arranged in fixed relation to the film guide, main and auxiliary bellows elements, and a carrier frame supporting said defining frame having the bed pivotally mounted thereon and movable into and out of the case, the said bellows elements extending from the carrier frame respectively to the carriage and to the film guide.

21. A photographic camera having a case provided with a film guide and a foldable camera bed, a lens carriage for support by the bed, an exposure defining frame movable toward and from the plane of the film guide, exposure defining means arranged in fixed relation to the film guide, main and auxiliary bellows elements, and a carrier frame supporting said defining frame having the bed pivotally mounted thereon and movable into and out of the case, and said bellows elements extending from the carrier frame respectively to the carriage and to the film guide, extension brackets being provided to support the carrier frame in its extended position.

22. A photographic camera having a case provided with a film guide and a foldable camera bed, a lens carriage for support by the bed, an exposure defining frame movable toward and from the plane of the film guide, exposure defining means arranged in fixed relation to the film guide, main and auxiliary bellows elements, and a carrier frame supporting said defining frame having the bed pivotally mounted thereon and movable into and out of the case, and said bellows elements extending from the carrier frame respectively to the carriage and to the film guide, extension brackets being provided to support the carrier frame in its extended position and foldable braces for supporting the bed in perpendicular relation to the plane of the carrier frame.

HARRY R. DURYEA.